US006720360B1

(12) United States Patent
Grootaert et al.

(10) Patent No.: US 6,720,360 B1
(45) Date of Patent: Apr. 13, 2004

(54) ULTRA-CLEAN FLUOROPOLYMERS

(75) Inventors: Werner M. A. Grootaert, Oakdale, MN (US); Georg Burkard, Altötting (DE); William D. Coggio, Kastl (DE); Klaus Hintzer, Woodbury, MN (US); Bernhard Hirsch, Burgkirchen (DE); Robert E. Kolb, Afton, MN (US); Albert Killich, Burgkirchen (DE); Gernot Loehr, Burgkirchen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/495,600

(22) Filed: Feb. 1, 2000

(51) Int. Cl.[7] .................................................. C08J 5/20
(52) U.S. Cl. ........................................ 521/28; 528/482
(58) Field of Search ............................. 521/28; 528/482

(56) References Cited

U.S. PATENT DOCUMENTS

| | | |
|---|---|---|
| 2,559,752 A | 3/1951 | Berry |
| 4,035,565 A | 7/1977 | Apotheker et al. .......... 526/249 |
| 4,132,845 A | 1/1979 | Covington et al. ......... 528/499 |
| 4,233,421 A | 11/1980 | Worm ........................ 525/343 |
| 4,282,162 A | 8/1981 | Kuhls ......................... 260/408 |
| 4,564,662 A | 1/1986 | Albin ......................... 526/247 |
| 4,728,680 A | 3/1988 | Hahn, Jr. .................... 523/310 |
| 4,745,165 A | 5/1988 | Arcella et al. .............. 526/247 |
| 4,912,171 A | 3/1990 | Grootaert et al. ........... 525/340 |
| 5,077,359 A | 12/1991 | Moore ........................ 526/206 |
| 5,262,490 A | 11/1993 | Kolb et al. ................. 525/343 |
| 5,285,002 A | 2/1994 | Grootaert .................... 526/222 |
| 5,378,782 A | 1/1995 | Grootaert .................... 526/255 |
| 5,463,021 A | 10/1995 | Beyer et al. ................ 528/482 |
| 5,708,131 A | 1/1998 | Morgan ...................... 528/481 |
| 5,955,556 A * | 9/1999 | McCarthy ................... 526/249 |

FOREIGN PATENT DOCUMENTS

| | | |
|---|---|---|
| DE | A 20 44 986 | 5/1975 |
| DE | 22 35 885 | 5/1976 |
| EP | 0 084 837 B1 | 8/1989 |
| EP | 0 226 668 B1 | 1/1992 |
| EP | 0 460 284 B1 | 5/1995 |
| EP | 0 708 797 B1 | 2/1998 |
| WO | WO-A-99/62830 | 6/1998 |
| WO | WO-A-99/63858 | 6/1998 |

OTHER PUBLICATIONS

"Modern Fluoropolymers", *High Performance Polymers for Diverse Applications*, edited by John Scheirs, John Wiley & Sons (1997), esp. pp. 225–227, 224–225, and 351.
"Nonionic Surfactants", edited by M. J. Schick, Marcel Dekker, Inc., New York, 1967.

* cited by examiner

*Primary Examiner*—Bernard Lipman
(74) *Attorney, Agent, or Firm*—James V. Lilly; Brian E. Szymanski

(57) ABSTRACT

High purity fluoropolymers are obtained by the emulsion polymerization process, removing essentially all ions and coagulating the polymer essentially without adding ions. These polymers are useful in the field of electronic devices.

12 Claims, No Drawings

ULTRA-CLEAN FLUOROPOLYMERS

FIELD OF THE INVENTION

The present invention relates to ultra-clean fluoropolymers, especially thermoplastic and elastomeric fluoropolymers, compositions incorporating such fluoropolymers, articles employing such fluoropolymers and methods of making and using such fluoropolymers.

BACKGROUND

High purity fluoropolymers are used in a number of industries. They are especially preferred for use in the electronic, semiconductor, optical, medical and pharmaceutical industries to name a few. These polymers have a relatively low level of extractable metals and metal compounds.

High purity fluoroelastomer compositions are known. See EP-B-0 708 797 which discloses an elastomer composition comprising
(A) a peroxide-curable elastomeric fluoropolymer,
(B) an organic acid acceptor,
(C) an organic peroxide,
(D) a coagent for the organic peroxide, and
(E) a fluoropolymer micropowder filler.
This composition is said to be free from carbon fillers and have less than 500 ppb of extractable metals and metal compounds. This low content of metals and metal compounds is achieved by selecting metal-free acid acceptors, coagents and fillers. The acid acceptors are generally strong organic bases.

SUMMARY OF THE INVENTION

It now has been found that high-purity fluoropolymers and corresponding fluoropolymer compositions are feasible even without the use of such organic acid acceptors. Thus the present invention comprises
  a process for preparing salt-free fluoropolymers,
  the so-obtained fluoropolymers,
  compositions containing such fluoropolymers,
  processes using such fluoropolymers or such compositions, and
  articles of or coated with the said fluoropolymers or such compositions.

The said process for preparing salt-free fluoropolymers comprises
  polymerizing one or more fluoromonomers by the aqueous emulsion polymerization process,
  removing from the so-obtained latex essentially all ions different than $NH_4^+$, $H^+$ and $OH^-$, and
  coagulating the fluoropolymer essentially without addition of ions.

The polymer of the invention comprises an emulsion polymerized fluoropolymer that is essentially free of all ions other than $NH_4^+$, $H^+$ and $OH^-$.

The preferred fluoropolymer is either a thermoplastic or an elastomeric polymer. The preferred elastomeric fluoropolymer is a curable elastomer such as a peroxide-curable elastomer or an elastomer having pendent nitrile groups.

The curable fluoropolymer composition of the invention comprises the fluoroelastomer and an appropriate curing agent. When a peroxide-curable elastomer is used the curable elastomer composition comprises
  a) a peroxide-curable fluoroelastomer that is essentially free of ions other than $NH_4^+$, $H^+$ and $OH^-$;
  b) an effective amount of a peroxide curative for the fluoroelastomers;
  c) optionally, and preferably, a coagent for the peroxide; and
  d) optionally, a partially crystalline fluoropolymer that is preferably essentially free from ions other than $NH_4^+$, $H^+$ and $OH^-$.

When a nitrile group containing elastomer is used the curable elastomer composition comprises
  a) a curable fluoroelastomer that has nitrile groups and that is essentially free of ions other than $NH_4^+$, $H^+$ and $OH^-$;
  b) an effective amount of an ammonia generating cure system, and
  c) optionally, a partially crystalline fluoropolymer that is essentially free of ions other than $NH_4^+$, $H^+$ and $OH^-$ The processes of using the polymers or polymer compositions of the invention include the steps of contacting a surface with the polymer or polymer composition and subsequently optionally causing the polymer or polymer composition to cure or otherwise become secure to the substrate.

The articles of the invention include
  a) shaped articles comprising the cured elastomer composition of the invention, and
  b) articles coated with the composition of the invention.

DETAILED DESCRIPTION

The aqueous emulsion polymerization process used in the present invention is known. In this process aqueous colloidal dispersions are obtained by polymerizing fluorinated monomers in an aqueous medium containing a relatively high amount of fluorinated emulsifiers such as salts of perfluoro octanoic acid and the like with mild agitation. This process is described in detail in "Modern Fluoropolymers", High Performance Polymers for Diverse Applications, edited by John Scheirs, John Wiley & Sons (1997), especially pages 225 to 227.

Emulsion polymerization is to be distinguished from the suspension polymerization process. The latter uses little or no emulsifier and vigorous agitation and results in a granular product.

Usually emulsion polymerization is carried out within a pressure range of 5 to 30 bar ($5·10^5$ to $3·10^6$ Pa) and within a temperature range of 5 to 100° C. Generally, emulsion polymerization processes use significant amounts of adjuvants.

It is generally accepted that a prerequisite for an aqueous emulsification is the use of a non-telogenic emulsifier (U.S. Pat. No. 2,559,752). As previously noted, fluorinated emulsifiers, most often perfluorinated alkanoic acids, are used. Generally they comprise from 0.02 to 3% by weight with respect to the polymer.

A further material used in the polymerization process is a water soluble initiator to start the polymerization. Commonly, salts of peroxo sulfuric acids are applied, often in the presence of further coagents like bisulfites or sulfinates (U.S. Pat. No. 5,285,002 and U.S. Pat. No. 5,378,782) or the sodium salt of hydroxy methane sulfinic acid (sold under the trade name RONGALIT). All of these initiators and the emulsifiers have an optimum pH-range where they show most efficiency and for this reason buffers are used. The buffers include phosphate, acetate or carbonate buffers or any other acid or base such as ammonia or alkali metal hydroxides.

The concentration range for the initiators and buffers can vary from 0.05 to 5% by weight, based on the aqueous polymerization medium.

The fluoropolymer of the invention comprises the emulsion polymerized product of one or more fluoroolefin monomers and, optionally a hydrocarbon olefin monomer. Generally, the fluoroolefin monomers have from 2–8 carbon atoms in their backbone. Examples of such fluoroolefin monomers include tetrafluoroethylene (TFE), vinylidene fluoride ($VF_2$), hexafluoropropylene (HFP) and fluorinated ethers such as perfluoro alkyl vinyl ethers (VE). Examples of useful hydrocarbon olefins include ethylene and/or propylene and "cure site monomers" such as bromine, iodine or nitrile group-containing monomers which can provide "cure sites" for curing the fluoropolymer.

In case of peroxide curable fluoroelastomers, bromine containing cure site comonomers are preferred such as a bromine-containing olefin, containing another halogen, preferably fluorine. Examples are bromotrifluoroethylene, 4-bromo-3,3,4,4-tetrafluorobutene-1 and a number of others noted in U.S. Pat. No. 4,035,565 and these are incorporated herein by reference. Brominated fluorovinyl ethers useful in the invention include $CF_2Br—R_f—O—CF=CF_2$, wherein $R_f$ is a fully fluorinated alkylene of up to 4 carbons atoms like —$CF_2$—, such as $CF_2BrCF_2OCF=CF_2$, cited in U.S. Pat. No. 4,745,165 and of the type ROCF=CFBr or ROCBr=$CF_2$ where R is a lower alkyl group or fluoroalkyl group each having up to 4 carbon atoms, such as $CH_3CF=CFBr$ or $CF_3CH_2OCF=CFBr$, cited in U.S. Pat. No. 4,564,662. The choice of bromine-containing units is based on copolymerizability with the major monomers and low branching tendency, in addition to cost and availability (U.S. Pat. No. 5,007,359, which is hereby incorporated by reference).

Nitrile-containing cure site monomers may also be used. Preferred examples are nitrile-containing fluorinated olefins and nitrile-containing fluorinated vinyl ethers, such as $CF_2=CFO(CF_2)_mCN$, $CF_2=CFO[CF_2CF(CF_3)O]_q(CF_2O)_s$ $CF(CF_3)CN$, $CF_2=CF[OCF_2CF(CF_3)]_rO(CF_2)_tCN$, where, in reference to the above formulaes m=2 to 12, q=0 to 4, r=1 to 2, s=0 to 6 and t=1 to 4. Representative examples of such a monomer include perfluoro(8-cyano-5-methyl-3,6-dioxa-1-octene), $CF_2=CFO(CF_2)_5CN$, $CF_2=CFO(CF_2)_3OCF(CF_3)CN$ $CF_2=CF—O—(CF_2)_4—O—CF(CF_3)CN$, and $CF_2=CF—O—(CF_2)_3—CN$.

As stated at the outset the invention is concerned with salt-free fluoropolymers which requires removing essentially all ions other than $NH_4^+$, $H^+$ and $OH^-$, preferably all ions except $H^+$ and $OH^-$ from the latex obtained by polymerization. Removal of the ions can be performed by dialysis. The preferred process for removing the said ions is ion exchange. This process is known, e.g. from U.S. Pat. No. 4,282,162, U.S. Pat. No. 5,463,021 or DE-A-20 44 986 and further processes have been disclosed in WO-A-99/62830 and WO-A-99/62858.

Following removal of the ions, the fluoropolymer is coagulated from the latex without addition of ions. This can be effected by the known freeze-coagulation process as described in U.S. Pat. No. 5,708,131. During this process the whole aqueous latex is frozen and the polymer is coagulated. This process can be performed batchwise or continuously. While the isolated polymer is already clean some subsequent washing steps with water may be beneficial.

Another process for coagulation without additions of ions is the so-called mechanical coagulation as disclosed in U.S. Pat. No. 5,463,021 for fluorothermoplasts. The fluorothermoplast dispersions are first compressed to pressures up to 200 to 400 bar and then decompressed through nozzles or slits and thereby the coagulation is achieved. The high pressures are produced by a so-called homogenizer. This technology does not work for elastomer dispersions due to clogging and jamming the equipment.

As suggested in DE . . . (filed of even date herewith, our reference number DYN 2000/U002) these difficulties can be overcome by generating high pressures with pressurized gases from 50 to 400 bar ($5 \cdot 10^6$ to $4 \cdot 10^7$ Pa).

In contrast to the process disclosed in U.S. Pat. No. 5,463,021 the coagulation by this technique appears to be brought about by the rapid expansion of the dissolved gas, preferably via a nozzle.

The preferred gases for use with this process are nitrogen, air or $CO_2$.

In yet another coagulation process a volatile water-miscible organic solvent effects the coagulation. The solvent is selected from the group consisting of alkanols of 1 to 4 carbon atoms and ketones of 2 or 3 carbon atoms. The said solvents should not have a significant swelling effect onto the said polymer, lest the coagulated or agglomerated polymer becomes too sticky thus impairing the work-up.

Mechanical and thermal methods for coagulating polymers are known from U.S. Pat. No. 5,463,021, EP-B-0 084 837, EP-B-0 226 668 and EP-B-0 460 284.

After being coagulated the fluoropolymer may be dewatered. One method of dewatering the polymer is by mechanical dewatering. This process is described in U.S. Pat. No. 4,132,845.

The wet polymers can be dried, usually in a temperature range of from 110° C., preferably 150° C., to 250° C., in the presence of a carrier gas like air or nitrogen.

In the following preferred embodiments with the respect to fluoroelastomers are described in more detail: specifically, the present invention provides fluoroelastomers which are essentially free of extractable ions. That means that less than 1000 ppm, preferably less than 500 ppm, anions and cations (other than $NH_4^+$, $H^+$ and $OH^-$) are found in the fluoropolymer (before adding cure chemicals and other ingredients).

The process to manufacture fluoroelastomer compounds essentially free of ions comprises:
a) purification of an aqueous fluoroelastomer latex (or a blend of aqueous fluoroelastomer latex and a latex of a partially crystalline fluoropolymer—if a fluoropolymer filler is required) by using separately a cationic and subsequently an anionic exchange treatment, or vice versa, and
b) coagulation of the purified latex by using salt-free methods.

Furthermore, the invention provides fluoroelastomer compositions comprising
a) a peroxide-curable fluoroelastomer essentially free of ions other than $NH_4^+$, $H^+$ and $OH^-$, and, based on the elastomeric polymer,
b) preferably less than 5.0 parts per one hundred parts of fluoropolymer resin (phr) of an organic peroxide,
c) preferably less than 10.0 phr of coagent, and
d) preferably less than 50 phr of a partially crystalline fluoropolymer essentially free of ions.

Most preferably the fluoropolymer compositions comprise the peroxide-curable fluoroelastomer and from 0.5 to 3 phr of the organic peroxide, from 1 to 7 phr of the coagent and from 10 to 40 phr of the partially crystalline fluoropolymer.

In addition to this the invention also comprises:
a) a nitrile group containing fluoroelastomer essentially free of ions other than $NH_4^+$, $H^+$ and $OH^-$, and, based on the elastomer polymer, b) less than 5 phr (preferably from 0.05 to 2 phr) of an ammonia generating cure system and c) less than 50 phr (preferably from 10 to 40 phr) of a partially crystalline fluoropolymer essentially free of such ions.

The partially crystalline fluoropolymer used as the filler in the present invention are polymers with melting points typically from 100 to 340° C. The partially crystalline fluoropolymers used in the invention are used in the form of their dispersions. Such dispersions can contain low molecular weight PTFE, the so-called micropowders or waxes (as described in DE-C-22 35 885) optionally modified with HFP, and/or VE. The dispersions comprise melt-processable copolymers of TFE and VE, e.g. perfluoro(propylvinyl) ether, known as "PFA", melt processable copolymers of TFE and HFP, known as "FEP", also partially crystalline polymers of TFE and ethylene (ET), known as "ETFE", or TFE, HFP or $VF_2$, known as "THV". These copolymers are extensively described in "Modern Fluoropolymers", cited above.

The elastomer latices with incorporated polymer fillers are prepared by blending latices either before ion exchange treatment or thereafter; this method ensures the most uniform distribution of the polymer filler and avoids any contamination as compared to dry blending as described in EP-B-0 708 797. Once blended in this manner the blends may be coagulated, dewatered and dried as described above.

It is essential to avoid the known coagulation chemicals like salts such as sodium or magnesium chloride or mineral acids since especially with regard to fluoroelastomers the coagulated products tend to be sticky and to clump together. Therefore, despite thorough washing the dried product still contains significant amounts of such added coagulation chemicals and of salts present in the polymerization recipe.

A preferred polymerization process comprises a minimum of adjuvants like buffers, or, especially without buffer.

A preferred embodiment of this invention comprises to polymerize more than one fluoropolymer by the emulsion process and to combine the so-obtained latices and work them up together.

The process according to this invention yields fluoropolymers which are essentially free of extractable ions.

The fluoropolymers according to this invention are especially useful for coating compositions.

If the fluoropolymer is a peroxide-curable elastomer it is especially useful in a curing composition containing an organic peroxide, a coagent and, optionally, a fluoropolymer filler.

If the fluoropolymer contains a nitrile group it is especially useful in a composition containing an ammonia generating catalyst.

The invention further provides ultra-clean fluoropolymer dispersions for coating articles by contacting said article with a coating composition containing the fluoropolymer and immediately after this coating step or at some later time optionally the coating will be cured to yield an article with excellent surface properties.

The invention further comprises ultra-clean materials for shaped articles from the fluoropolymers and especially fluoroelastomers, in the latter case by subsequent curing of the article.

A widely used cure-system comprises polyol compounds in the presence of onium compounds (U.S. Pat. No. 4,233, 421, U.S. Pat. No. 4,912,171 and U.S. Pat. No. 5,262,490) which adds further ion loadings to the finished article. For the manufacture of electronic components such as semiconductor devices unusually stringent requirements exist for sealing compounds. Apparently, fluoroelastomers cured by known processes cannot meet such requirements.

While it is known to run the polymerization in organic solvents (Modern Fluoropolymers, loc. cit., pages 224 to 225) these solvents are expensive or are going to be phased out nowadays due to environmental concerns.

EP-B-708 797 discloses the use of peroxide-curable fluoroelastomers with a fluoropolymer micropowder filler for semiconductor applications. There is no disclosure how the materials were purified. Due to the fact that this process requires organic acid acceptors the overall ion content seems to be unsatisfactorily high.

The peroxide curable elastomers are cured by a free radical process. A curable composition comprises polymer and a peroxide to generate free radicals at curing temperatures. A dialkyl peroxide which decomposes at a temperature above 50° C. is especially preferred when the composition is to be processed at elevated temperatures before it is cured. In many cases one will prefer to use a di-tertiarybutyl peroxide having a tertiary carbon atom attached to peroxy oxygen. Among the most useful peroxides of this type are 2,5-dimethyl-2,5-di(tertiarybutylperoxy)-hexyne-3 and 2,5-dimethyl-2,5-di(tertiarybutylperoxy)-hexane. Other peroxides can be selected from such compounds as dicumyl peroxide, dibenzoyl peroxide, tertiarybutyl perbenzoate, and di[1,3-dimethyl-3-(tertiarybutylperoxy)-butyl]carbonate.

Another material which is usually blended with the composition before it is made into end products is a coagent composed of a polyunsaturated compound which is capable of cooperating with the peroxide to provide a useful cure. These crosslinking coagents can be added in an amount equal to 0.5 to 10%, preferably about 1 to 7%, by weight of the copolymer content, and may be one or more of the following compounds: triallyl cyanurate; triallyl isocyanurate; tri(methallyl)-isocyanurate; tris(diallylamine)-s-triazine; triallyl phosphite; N,N-diallyl acrylamide; hexaallyl phosphoramide; N,N,N',N'-tetraallyl terephthalamide, N,N,N',N'-tetraallyl malonamide; trivinyl isocyanurate; 2,4, 6-trivinyl methyltrisiloxane; and tri(5-norbornene-2-methylene) cyanurate. Particularly useful is triallyl isocyanurate (U.S. Pat. No. 5,077,359).

Usually inorganic acid-acceptors are added for the peroxide cure step. Optionally, at least one metal compound selected from divalent metal oxides or divalent metal hydroxides is frequently blended with the fluoroelastomer during preparation or before it is cured. While the presence of such compounds improves the heat aging resistance and thermal stability of the polymer (U.S. Pat. No. 5,077,359, col. 5, lines 33 to 48) the addition of such acid-acceptors would have a very detrimental effect to the ion content and extractables of the resulting elastomer composition according to the present invention. Thus, for the curing of the peroxide curable fluoroelastomers with or without polymeric filler it is not necessary to add further any kind of acid acceptors for obtaining excellent cure characteristics and physical properties and articles with low ion contents.

In cases where very low compression sets are required, the addition of organo-onium compounds are beneficial to improve properties in formulations that do not contain organic or inorganic acid acceptors. This may be done with either peroxide curable or nitrile containing fluoroelastomers.

Organo-onium compounds represent one class of useful additives to the fluoroelastomer compositions of the invention. Suitable organo-onium compounds are known in the art, generally as vulcanization accelerators for the elastomers cured by dihydroxy-containing curing agents. As it is known, an organo-onium is the conjugate acid of a suitable Lewis-base (e.g. phosphine, amine, ether and sulfide) and can be formed by reacting said Lewis-base with a suitable alkylating agent (e.g. an alkyl halide or aryl halide). The organo-onium compounds contain at least one heteroatom such as N, P, S or O bonded to organic or inorganic moieties. One particularly useful class of the quaternary onium compounds broadly comprises relatively positive and negative ions wherein phosphorous and nitrogen generally comprise the central atom of the positive ion and the negative ion may be an organic or inorganic anion (e.g. halide, sulfate, acetate, phosphate, hydroxide, alkoxide, phenoxide).

Organo-onium compounds suitable for incorporating are described in U.S. Pat. No. 4,233,421, U.S. Pat. No. 4,912,171 and U.S. Pat. No. 5,262,490. Examples are triphenylbenyl phosphonium chloride, tributyl alkyl phosphonium chloride, tributyl benzyl ammonium chloride, tetrabutyl ammonium bromide, triarylsulfonium chloride.

Another class of organo-onium compounds are represented by the following formula

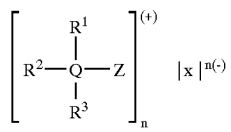

wherein

Q is nitrogen or phosphorus;

Z is a hydrogen atom or is a substituted or unsubstituted, cyclic or acyclic alkyl group having from 4 to about 20 carbon atoms that is terminated with a group of the formula —COOA where A is a hydrogen atom or is a $NH_4^+$-cation or Z is a group of the formula $CY_2$—COOR' where Y is a hydrogen or halogen atom, or is a substituted or unsubstituted alkyl or aryl group having from 1 to about 6 carbon atoms that may optionally contain one or more catenary heteroatoms and where R' is a hydrogen atom, a $NH_4^+$-cation, an alkyl group, or is an acyclic anhydride, e.g. a group of the formula —COR where R is an alkyl group or is a group that itself contains organo-onium (i.e. giving a bis-organo-onium); preferably R' is hydrogen; Z may also be a substituted or unsubstituted, cyclic or acyclic alkyl group having from 4 to about 20 carbon atoms that is terminated with a group of the formula —COOA where A is a hydrogen atom or is a $NH_4^+$-cation;

$R^1$, $R^2$ and $R^3$ are each, independently, a hydrogen atom or an alkyl, aryl, alkenyl, or any combination thereof; each $R^1$, $R^2$ and $R^3$ can be substituted with chlorine, fluorine, bromine, cyano, —OR" or —COOR" where R" is a $C_1$ to $C_{20}$ alkyl, aryl, aralkyl, or alkenyl, and any pair of the $R^1$, $R^2$ and $R^3$ groups can be connected with each other and with Q to form a heterocyclic ring; one or more of the $R^1$, $R^2$ and $R^3$ groups may also be a group of the formula Z where Z is as defined above;

x is an organic or inorganic anion (e.g. halide, sulfate, acetate, phosphate, phosphonate, hydroxide, alkoxide, phenoxide or bisphenoxide); and n is a number equal to the valence of the anion X.

Also useful as additives to the fluorinated elastomeric composition are phosphates, phosphine oxides and amine oxides. These compounds include for example alkyl and aryl phosphate, triaryl phosphine oxides, trialkyl phosphine oxide, triarylamine oxide and trialkyl amine oxide. Such compounds include those of the formula $PR_3O$ and $NR_3O$ where each R substituent is, independently, a linear or branched alkyl or aryl group.

The organo-onium compounds can be selected from a large variety of compounds in such a way to meet the specific requirements of various application fields.

Nitrile-containing polymers are usually cured by a catalytic interaction of alkyl tin compounds with the nitrile group, thereby creating a triazine crosslinked structure (Modern Fluoropolymers, cited above, page 351). The addition of tin compounds of course is also detrimental to the ion level of the elastomer. It is an aspect of the invention to cure the purified nitrile elastomer blends in the presence of ammonia-generating compounds that are solid or liquid at ambient conditions and generate ammonia under curing conditions. Such compounds include, for example, hexamethylene tetramine (urotropin), dicyan diamid and substituted and unsubstituted triazine derivatives represented by the formula

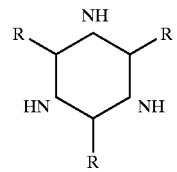

wherein R is a hydrogen or a substituted or unsubstituted alkyl, aryl or aralkyl group having from 1 to about 20 carbon atoms. Specific useful triazine derivatives include hexahydro-1,3,5-s-triazine and acetaldehyde ammonia trimer.

Ion Exchange Step:

The removal of the ions from the corresponding dispersions is achieved by using cation and anion exchangers treatment. It is a preferred way to remove first the anions (such as perfluorooctanoate, in the following PFOA, sulfate, chloride, fluoride etc.) from the dispersions. The removal of the anions via anion exchangers is the critical step for the following reasons:

The latex particles have a submicroscopic diameter of less than 400 nm. The latex particles are anionically stabilized in the sense of colloid chemistry. The anionic stabilization is provided by anionic endgroups, mostly —COOH— and —$OSO_3H$— groups, and by the adsorbed anionic emulsifier such as PFOA. Such anionically stabilized dispersions tend to coagulate readily in an anion exchange bed and thus jam the ion exchange bed. Therefore, the treatment of an anionically stabilized dispersion with an anion exchanger is considered to be technically not feasible, in particular at higher concentrations.

The impairing or clogging of the anion exchange bed is already observed at solid contents 1000 times lower than those of the raw polymer dispersions, that is the dispersion after polymerization. This coagulation does not occur in the presence of a nonionic emulsifier usually in the range of 0.001 to 3.0% by weight of solid content as described in WO-A-99/62830 and WO-A-99/62858. Nonionic emulsifiers are described in detail in "Nonionic Surfactants" edited by M. J. Schick, Marcel Dekker, Inc., New York, 1967.

The choice of the nonionic emulsifier is not critical. Alkyl aryl polyethoxy alcohols, alkyl polyethoxy alcohols, or other nonionic emulsifier may be used.

Preferred nonionic surfactants are alkyl aryl polyethoxy alcohol type, e.g. ®TRITON X 100 (Rohm & Haas) or alkyl polyethoxy alcohol type, e.g. ®GENAPOL X 080 (Clariant GmbH).

The choice of the ion exchange resin is not very critical. Usable anion exchange resins are available: ®AMBERLITE IRA 402, ®AMBERJET 4200 (Rohm and Haas), ®PUROLITE A 845 (Purolite GmbH), ®LEWATIT MP-500 (Bayer AG), ®DOWEX 1X–2X series (Dow Chemical).

The specific basicity of the anion exchanger used is not very critical. Weakly, medium and strongly basic resins can be used. Preferably, the ion exchange resin is transformed to the OH⁻ form.

The flow rate is not very critical, standard flow rates can be used. The flow can be upward or downward.

The ion exchange process can also be carried out as a batch process by mildly stirring the dispersion with the ion exchange resin in a vessel. After this treatment the dispersion is isolated by filtration.

The removal of the anions is preferably carried out with raw dispersions from the polymerization. Such dispersions generally have a solid content of 10 to 40% by weight, to which is added sufficient nonionic emulsifier to provide dispersion stability and, if necessary, to decrease the solid content to less than about 20%.

In a subsequent step the cations are removed by using readily available resins like LEWATIT SP 112 (Bayer AG), preferably in the $H^+$-form.

The use of mixed ion exchange resins (which have anion and cation exchange groups) is a possibility, too.

The specific composition of the fluoropolymer in the dispersion is not critical for the success of the ion exchange process.

Experimental Section

Description of Materials Used:

Anionic exchange resin, AMBERLITE IRA 402 (chloride form) was supplied by Rohm and Haas. The resin was put into the OH-form with a 5% NaOH solution. After the elution of the NaOH solution, the column is flushed with deionized water (DI).

Cationic exchange resin, LEWATIT SP 112 ($NH_4^+$ form) was supplied by Bayer AG. It was put into the $H^+$-form by an aqueous mineral acid such as sulfuric or hydrochloric acid. After treatment of the resin with the acid solution the column is rinsed with excess DI.

Dispersion Preparation:

The fluoroelastomer and/or the partially crystalline fluoroplastic dispersion were prepared separately by emulsion polymerization. The desired mixtures thereof were prepared by blending the thus obtained dispersions. The solids content was adjusted to 20%. The requested amount of a nonionic surfactant is added in the form of a diluted solution. Practical levels of nonionic surfactant are in the range of 10 to 30,000 ppm of surfactant based on total weight of the dispersion mixture. Preferred ranges are from 10 to 100 ppm. Typical nonionic surfactants are, for example TRITON 100 X or GENAPOL X 080.

Column Ion Exchange Process:

The cationic and anionic exchange processes are similar. The polymer latex is ion exchanged by passing the dispersion through a column packed with the desired exchange resin (dimension of the column: diameter 6 cm, height 30 cm). The latex can be delivered to the column by any means typical for a chromatographic procedure, e.g. gravity feed, static siphon or an automatic pumping system. The particular method used to pass the dispersion through the column is not critical. The elution rate should not exceed 3 times the bed volume/hour.

Analytical Test Methods:

PFOA concentrations were determined from dispersion samples taken before and after ion exchange. The PFOA level was determined by gas chromatography according to standard methods (WO-A-99/62830 and WO-A-99/62858). The concentrations of $F^-$, $Cl^-$, $Br^-$, $SO_4^{2-}$, $PO_4^{3-}$ were determined by ion chromatography of the "mother liquor" which is the particle free aqueous phase of the dispersion as obtained by freeze coagulation. The cation contents of the samples were determined by ion conductive plasma (ICP) of the polymer samples. Samples were treated with $HNO_3$ followed by pyrolysis at 550° C. for 10 minutes in a sealed pyrolysis bomb before subjecting them to ICP.

Test Methods:

In the following examples, indicated results were obtained using the following test methods:

Press-cure samples. Unless otherwise noted, 150×150× 2.0 mm sheets were prepared by pressing at about 6.9 Mega Pascals (MPa) for 10 minutes at 177° C. for measuring physical properties.

Post-cure samples, unless otherwise noted, were prepared by placing a press-cured sample in a circulating air oven. The oven was maintained at 232° C. and the samples treated for 16 hours.

Tensile strength at break, elongation at break, and modulus at 100% elongation were determined using ASTM D 412-92 on samples cut from the press-cure or post-cure sheet with ASTM Die D. Units reported in MPa.

Hardness was determined using ASTM D 2240-85 Method A with a Type A-2 Shore Durometer.

Compression set was determined on O-rings using ASTM 395-89 Method B. The O-rings had a cross-section thickness of 3.5 mm (0.139 inch). After post-curing, the O-rings were compressed for 70 hours at 200° C. Results are reported as a percentage of permanent set.

The melt flow index (MFI) was determined according to ISO 12086. Mooney viscosities were measured according to ASTM D-1646. All percentages are by weight unless otherwise stated.

EXAMPLE 1

5 kg of a dispersion with a solids content of 28.5% of a perfluoroelastomer with a composition: 54% TFE, 45% perfluoromethylvinylether, 1% bromotrifluoroethylene (Mooney viscosity ML 1+10/121° C.=85) was diluted to 18% solids with DI. 75 g of a 20% solution of GENAPOL X 080 in DI was added to this mixture and stirred slowly over night. The dispersion was subjected to anionic exchange by passing the dispersion through a 600 ml column packed with 400 ml of the anionic exchange resin prepared as described above. The elution rate was adjusted to 600 ml dispersion/hour. The pH of the exchanged dispersion was 11. The anion contents are listed in Table 1 and compared with a mother liquor from the not ion exchanged dispersion.

TABLE 1

| | Anion content in ppm of mother liquors | | | | | | |
|---|---|---|---|---|---|---|---|
| Sample | pH | $F^-$ | $Cl^-$ | $Br^-$ | $SO_4^{2-}$ | $PO_4^{3-}$ | PFOA |
| Not ion exchanged | 6.2 | 660 | 43 | 170 | 660 | 24 | 2100 |
| Anion exchanged | 11 | 5 | <5 | <5 | <5 | <10 | 80 |

EXAMPLE 2

The dispersion after anionic exchange from Example 1 was treated in a similar manner with 400 ml of the cationic exchange resin. The exchanged dispersion had a pH of 3. The polymer was isolated from the dispersion by freeze coagulation. The polymer resin was analyzed by ICP as described above. The cation contents are listed in Table 2 and are compared to the polymer obtained via freeze coagulation from a not ion exchanged dispersion and, additionally, compared with a polymer obtained by $MgCl_2$-coagulation to demonstrate the advantage of ion-free coagulation methods.

TABLE 2

Cation content in ppm of polymer resins

| Sample | Mg | Fe | K | Na |
|---|---|---|---|---|
| Resin not ion exchanged | 1 | 1 | 130 | 22 |
| Resin ion exchanged | 1 | <1 | <1 | <1 |
| Resin $MgCl_2$ coagulated | 46.8 | 3.6 | 50 | 10 |

The also measured concentration of Cu, Al, Ni, Zn, Ca, Cs, Mn, Co, Li and Ba were found in the ion exchanged resin to be less than 1 ppm.

Combining these results with those of Table 1 demonstrates that the polymers according to this invention are ultra-clean.

EXAMPLE 3

Batch Ion Exchange Process

A 100 ml of anionic exchange resin was mixed with 50 ml of DI and 200 ml of dispersion of Example 1, placed in a glass beaker and mildly agitated for 24 hours. The dispersion was separated from the resin by filtration. A sample was freeze coagulated and the anion content was determined from the mother liquor as described before. The results are listed in Table 3.

TABLE 3

Ion content in ppm obtained by batch process

| Sample | $F^-$ | $Cl^-$ | $Br^-$ | $SO_4^{2-}$ | $PO_4^{3-}$ | PFOA |
|---|---|---|---|---|---|---|
| Not ion exchanged | 660 | 43 | 170 | 660 | 24 | 2100 |
| Anion exchanged | <10 | <1 | <10 | 11 | <10 | 120 |

EXAMPLE 4

An ion exchanged dispersion according to Example 2 with a solid content of 20% was pressurized with nitrogen to 180 bar in a pressure-tight container at ambient temperature. The pressurized latex was fed to a nozzle (from the homogenizer as described in U.S. Pat. No. 5,463,021) and there expanded to normal pressure. The resulting coagulate was washed and dewatered in a filterpress. The aqueous filtrate contained 0.5% of solids.

EXAMPLE 5

Example 4 was repeated with carbon dioxide instead of nitrogen and pressurized at 40° C. to 100 bar. The aqueous filtrate contained 0.3% of solids.

EXAMPLES 6 to 10

These samples demonstrate the purity of peroxide cured samples for different compositions with respect to the elastomer and the use of partially crystalline fluoropolymer fillers. The materials were purified according to the inventive procedure as described in Examples 1 and 2. The resins were recovered by freeze coagulation (Examples 6, 7 and 10) or mechanical coagulation (Examples 8 and 9). Table 4 identifies the used formulations for the curing with and without organo-onium compounds and the curing performance. Table 5 lists some extraction datas of the cured materials and shows a very low content of extractible ions.

EXAMPLE 6

Terpolymer of 31% $VF_2$, 37% HFP, 31% TFE, 1% bromotrifluoroethylene (BTFE), Mooney viscosity ML 1+10/ 121° C.=70.

EXAMPLE 7

Mixture of
  80% of a terpolymer from Example 6 and
  20% of the PFA bipolymer (96% TFE, 4% PPVE), MFI 372° C., 5 kg=2.2 g/10 min.

EXAMPLE 8

Perfluoroelastomer containing 54% TFE, 45% perfluoromethyl vinylether, 1% BTFE, Mooney viscosity ML 1+10/ 121° C.=85.

EXAMPLE 9

Mixture of
  80% of an elastomer from Example 8 and
  20% of PFA of Example 7.

EXAMPLE 10

Mixture of
  80% of an elastomer from Example 6 and
  20% of a terpolymer: 20% HFP, 63% TFE, 17% ET, MFI 297° C., 5 kg=10.5 g/10 min.

TABLE 4

Compound formulation of ultra-clean materials and curing performance [all values expressed as parts per hundered parts of rubber (pphr)]

| | Example designation | | | | | | | | |
|---|---|---|---|---|---|---|---|---|---|
| | 6(a) | 6(b) | 7(a) | 7(b) | 8(a) | 8(b) | 9(a) | 9(b) | 10 |
| | | | | pphr (rubber) | | | | | |
| | 100 | 100 | 125 | 125 | 100 | 100 | 125 | 125 | 125 |
| Compound formulation | | | | | | | | | |
| On1 | | 0.75 | | 0.75 | | | | | |
| On2 | | | | | | 1.0 | | 1.0 | 1.5 |
| Triallylisocyanurate | 3.0 | 3.0 | 3.0 | 3.0 | 1.8 | 1.8 | 1.8 | 1.8 | 3.0 |

TABLE 4-continued

Compound formulation of ultra-clean materials and curing performance [all values expressed as parts per hundered parts of rubber (pphr)]

| | \multicolumn{9}{c|}{Example designation} |
|---|---|---|---|---|---|---|---|---|---|
| | 6(a) | 6(b) | 7(a) | 7(b) | 8(a) | 8(b) | 9(a) | 9(b) | 10 |
| | \multicolumn{9}{c|}{pphr (rubber)} |
| | 100 | 100 | 125 | 125 | 100 | 100 | 125 | 125 | 125 |
| 2,5-dimethyl-2,5-bis (tertiarybutylperoxy) hexane | 1.25 | 1.25 | 1.25 | 1.25 | 0.75 | 0.75 | 0.75 | 0.75 | 1.25 |
| Cure characteristics | | | | | | | | | |
| M DR 177° C. 0,5° Arc | | | | | | | | | |
| ML | 0.67 | 0.67 | 1.73 | 1.47 | 1.74 | 1.71 | 3.60 | 3.45 | 1.17 |
| MH | 6.00 | 6.91 | 6.47 | 9.83 | 9.66 | 9.31 | 12.53 | 14.88 | 8.61 |
| Ts-2 | 0.96 | 0.83 | 1.12 | 0.67 | 0.55 | 0.58 | 0.55 | 0.52 | 1.53 |
| Ts-50 | 1.04 | 0.95 | 1.62 | 0.83 | 0.65 | 0.68 | 0.66 | 0.69 | 1.63 |
| Ts-90 | 2.20 | 1.97 | 2.83 | 1.77 | 0.98 | 1.07 | 1.75 | 1.46 | 3.14 |
| Compression set 70 h, 200° C., 3.5 mm (0.139") O-rings | 46.7 | 20.9 | 39.4 | 24.8 | 27.4 | 19.7 | 34.8 | 22.0 | 40.4 |

All compositions contain 100 parts of elastomer, "125 parts" means 100 parts of elastomer +25 parts of filler.
(a) means compositions without and (b) with onium salt On1 or On2.

On1 is triphenylbenzyl phosphonium/chloride (neat).

On2 is Triphenylbenzyl phosphonium/chloride (neat)/methanol 50% solution

Table 5: Extraction data in ng/g of cured samples in ultra-pure water. Leaching volume: 250 ml, sample weight: 10 g cut-outs of sheets of 2 mm thickness, leaching time: 14 days at 85° C.

| Example designation | 6(a) | 6(b) | 7(a) | 7(b) | 8(b) | 9(b) |
|---|---|---|---|---|---|---|
| Cations: *) | | | | | | |
| Potassium | 10 | 10 | 5 | 5 | | |
| Sodium | 20 | 30 | 15 | 5 | 5 | 5 |
| Anions; | | | | | | |
| Fluoride | 150 | 100 | 85 | 100 | 30 | 50 |
| Chloride | 5 | 20 | 10 | 20 | 10 | 25 |
| Bromide | 25 | 30 | 10 | 20 | 15 | 10 |

*) Al, Ca, Co, Cu, Fe, Mg, Ni, Zn, Sn, $NH_4^+$ are below detection limits.

EXAMPLE 11

An ion-echanged perfluoroelastomer/PFA blend was coagulated by freeze and dried at 130° C. The blend consists of
- 80% elastomer containing 48% TFE, 46% perfluoromethylvinylether and 6% of a nitrile cure site monomer ($CF_2$=CF—O—($CF_2$)$_3$—O—CF($CF_3$)—CN, with a Mooney viscosity: ML 10+1/121° C.=85, and
- 20% PFA of containing 96% TFE and 4% perfluoro-(propylvinyl)ether (PPVE) with an MFI 372/5=2.2 g/10 min.

100 g of the blend were compounded with 1 g hexamethylene tetramine. Sheets of the compounded mixtures were pressed for 15 minutes at 177° C. and subsequently post-cured under nitrogen using the following 6 stages of conditions: 25 to 200° C. over 6 hours, 200° C. for 16 hours, 200 to 250° C. over 2 hours, 250° C. for 8 hours, 250 to 300° C. over 2 hours and 300° C. for 18 hours. The following properties were measured:

| Tensile strength: | 14 MPa |
|---|---|
| Elongation: | 120% |
| Shore A hardness: | 80 |
| Compression set: | 20.4% |

Extraction studies in ultra-pure water at 85° C. after 14 days (sample weight: 2 g, leaching volume: 500 ml) resulted in a content of 50 µg/L ammonium and 15 µg/L fluoride. Al, Cu, Mg, Zn, Fe, Ni, Ca, K, sulfate, chloride are below detection limit.

What is claimed is:

1. A process for preparing an ultra-clean fluoropolymer, which comprises
   polymerizing one or more fluoropolymers by the aqueous emulsion polymerization process,
   removing from the so-obtained latex essentially all ions different than $NH_4^+$, $H^+$ and $OH^-$ by contacting the latex with cation and anion exchange resins, and
   coagulating the fluoropolymer essentially without addition of ions.

2. The process as claimed in claim 1, wherein the fluoropolymer is a thermoplast or an elastomer.

3. The process as claimed in claim 1, wherein the emulsion polymerization process is performed with little or no buffer.

4. The process as claimed in claim 2, wherein the elastomer is peroxide-curable.

5. The process as claimed in claim 2, wherein the elastomer contains nitrile groups.

6. The process as claimed in claim 1, wherein coagulating is effected by freeze coagulation, by a mechanical coagulation with a pressurized gas or by adding an organic water-miscible, volatile solvent selected from the group consisting of alkanols of 1 to 4 carbon atoms and ketones of 2 to 3 carbon atoms which solvents do not essentially swell the said polymer.

7. A process for preparing an ultra-clean fluoropolymer, which comprises
   polymerizing one or more fluoropolymers by the aqueous emulsion polymerization process,
   removing from the so-obtained latex essentially all ions different than $NH_4^+$, $H^+$ and $OH^-$ by contacting the latex with cation and anion exchange resins, and
   coagulating the fluoropolymer essentially without adding salts or mineral acids.

8. The process as claimed in claim 7, wherein the fluoropolymer is a thermoplast or an elastomer.

9. The process as claimed in claim 7, wherein the emulsion polymerization process is performed with little or no buffer.

10. The process as claimed in claim 7, wherein the fluoropolymer is a peroxide-curable elastomer.

11. The process as claimed in claim 7, wherein the fluoropolymer is an elastomer that contains nitrile groups.

12. The process as claimed in claim 7, wherein coagulating is effected by freeze coagulation, by a mechanical coagulation with a pressurized gas or by adding an organic water-miscible, volatile solvent selected from the group consisting of alkanols of 1 to 4 carbon atoms and ketones of 2 to 3 carbon atoms which solvents do not essentially swell the said polymer.

* * * * *

UNITED STATES PATENT AND TRADEMARK OFFICE
CERTIFICATE OF CORRECTION

PATENT NO. : 6,720,360 B1  
DATED : April 13, 2004  
INVENTOR(S) : Grootaert, Werner M. A.

It is certified that error appears in the above-identified patent and that said Letters Patent is hereby corrected as shown below:

Title page,
Item [56], References Cited, U.S. PATENT DOCUMENTS, please add the following references:

-- JP     08059940     03/05/1996 (Abstract only)  
       PCT   WO 95/02634  01/26/1995  
       PCT   WO 01/02448  01/11/2001  
       PCT   WO 01/27194  04/19/2001 --

Column 1,
Line 57, "$OH^{31}$" should be shown as -- $OH^-$ --

Signed and Sealed this

Thirteenth Day of July, 2004

JON W. DUDAS  
*Acting Director of the United States Patent and Trademark Office*